(12) United States Patent
Anderson (10) Patent No.: US 8,613,396 B1
(45) Date of Patent: Dec. 24, 2013

(54) COMBINED WATER HOSE AND TEMPERATURE-OPERATED WATER FLOW VALVE AND ASSOCIATED METHOD

(76) Inventor: David B. Anderson, Riverside, CA (US)

(*) Notice: Subject to any disclaimer, the term of this patent is extended or adjusted under 35 U.S.C. 154(b) by 888 days.

(21) Appl. No.: 12/776,050

(22) Filed: May 7, 2010

Related U.S. Application Data (60) Provisional application No. 61/215,705, filed on May 8, 2009.

(51) Int. Cl.
*G05D 23/02* (2006.01)

(52) U.S. Cl.
USPC ..... 236/93 A; 236/93 R; 236/99 J; 236/99 K; 236/100

(58) Field of Classification Search
USPC .......... 236/93 R, 93 A, 99 R, 99 J, 99 K, 100
See application file for complete search history.

(56) References Cited

U.S. PATENT DOCUMENTS

| | | | |
|---|---|---|---|
| 4,924,069 A | 5/1990 | Giordani | |
| 4,948,041 A * | 8/1990 | McCauley | 236/93 A |
| 5,095,559 A | 3/1992 | Liljegren | |
| 7,055,466 B2 | 6/2006 | Long | |
| 2009/0266435 A1 * | 10/2009 | Ferrone | 138/33 |

* cited by examiner

*Primary Examiner* — Marc Norman (57) ABSTRACT

A temperature-operating water flow valve may include a hollow body having axially offset proximal and distal open ends respectively such that the body may have an internal temperature. A temperature-activated plunger release mechanism may be seated inside the body and intermediately positioned between the proximal and distal open ends respectively. The temperature-activated plunger release mechanism may be automatically reciprocated along a linear travel path as the internal temperature rises above a threshold internal temperature and falls below the threshold internal temperature respectively. A temperature-activated plunger release mechanism may automatically open and close during the reciprocation along the linear travel path such that heated water is respectively permitted and prohibited to egress the distal open end of the body.

13 Claims, 5 Drawing Sheets

COMBINED WATER HOSE AND TEMPERATURE-OPERATED WATER FLOW VALVE AND ASSOCIATED METHOD

CROSS REFERENCE TO RELATED APPLICATIONS

This application claims the benefit of U.S. Provisional Application No. 61/215,705, filed May 8, 2009, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to water flow valves and, more particularly, to a temperature-activated water flow valve for providing users with a convenient means of automatically discharging the flow of heated water from a water hose to a swimming a pool.

2. Prior Art

In a variety of forms, warmth is relaxing and pleasurable to most people—basking in the sun; sitting by an open fire or a woodstove; reclining in a hot bath, whirlpool or spa; dressing in a warm room; a warm, dry towel after a shower or bath—all of these experiences are enjoyable. Many of them require some form of heating assembly, and heating assemblies of many types are widely available to fulfill the requirements. In some cases, however, the available heating assemblies have significant disadvantages. An example of an extremely costly and wasteful use of heat for comfort and pleasure is a heated swimming pool or hot tub. The installation for heating swimming pools and hot tubs costs several thousands of dollars, and many hundreds of dollars have to be spent for fuel each year. For example, the water for bathtubs, spas, hot tubs, whirlpools and the like is almost always heated by a water heater. In most installations the water in those vessels cannot be re-circulated through the water heater, so the only way to maintain or increase the water temperature is to add more hot water, perhaps releasing some of the cooled water to make room for the added hot water.

In an attempt to eliminate the excessive amounts of electrical or gas energy necessary to adequately heat the water of certain pools and hot tubs, solar heating applications have been introduced into the art. Such solar water heaters typically consist of a water reservoir and solar heating compartment for transferring the heat of the sun's rays to the water contained within the assembly. Unfortunately, there is no convenient low-cost means of allowing such solar heating applications to automatically release the heated water when it has reached a desired temperature.

Accordingly, a need remains for a temperature-activated water flow valve that is removably connected to a hose in order to overcome the above-noted shortcomings. The present invention satisfies such a need by providing a assembly that is convenient and easy to use, is durable yet lightweight in design, is versatile in its applications, and inexpensively and automatically sends pulses of inexpensive solar-heated water into a pool.

BRIEF SUMMARY OF THE INVENTION

In view of the foregoing background, it is therefore an object of the present invention to provide an assembly for selectively ejecting naturally heated water stored in a hose. These and other objects, features, and advantages of the invention are provided by a combined water hose and temperature-operated water flow valve.

The combined water hose and temperature-operated water flow valve may include a water hose having a plurality of thermo-conductive heating elements located therein for heating water inside the water hose. A temperature-operating water flow valve may be removably coupled to the water hose.

The temperature-operating water flow valve may include a hollow body preferably having axially offset proximal and distal open ends respectively such that the body may have an internal temperature. A temperature-activated plunger release mechanism may be seated inside the body and intermediately positioned between the proximal and distal open ends respectively. The temperature-activated plunger release mechanism may be automatically reciprocated along a linear travel path as the internal temperature rises above a threshold internal temperature and falls below the threshold internal temperature respectively. In this way, the temperature-activated plunger release mechanism may automatically open and close during the reciprocation along the linear travel path such that heated water is respectively permitted and prohibited to egress the distal open end of the body.

The energy of the sun may be utilized to heat the water contained within the hose. Thus, heated water is selectively released from the valve at a predetermine temperature. Such an arrangement provides the unexpected and unpredicted advantage of using the radiant heat of the sun to heat the cold water within the hose and further release the heated water into a swimming pool for example, thus saving energy costs for a user.

The temperature-activated plunger release mechanism may include a first retention plate preferably having a plurality of apertures formed therein for permitting water to flow downstream towards the distal open end. The first retention plate preferably has a shell integrally formed therewith and axially extending towards the distal open end. A wax pellet may be located within the shell. A first piston may be dynamically interfitted within the shell and directly abutted against the wax pellet. A stem may be connected to the first piston.

The hollow body may further include a valve seat inwardly protruding towards a center of the body such that a maximum diameter of the valve seat is less than a maximum diameter of the body. A second piston may be connected to the stem and removably conjoined to the valve seat. A deformably resilient spring may be fixedly attached to the second piston. A second retention plate may be engaged with the spring and located at the distal open end of the body. The second retention plate preferably has a plurality of openings formed therein for permitting the heated water to egress the body. Such an arrangement provides the unexpected and unpredictable advantage of providing a small and compact release mechanism linearly arranged within the valve body that can be fitted to a conventional hose adaptor without the use of intervening elements.

The wax pellet may be at a solid state when the internal temperature is below the threshold internal temperature. The wax pellet may expand to a melted state when the internal temperature is above the threshold internal temperature. It is well known in the art that such wax pellets may be utilized in automotive thermostats and hot water safety relief valves and can be applied to a wide range of applications that require specific, narrow temperature ranges safely and reliably. For example, "Astorstat" distilled waxes have successfully passed thousands of expansion-cycles without suffering any critical property degradation as referenced in http://igi-wax.com/industries-applications/thermostat-and-distillation-products/.

The wax pellet may be selectively designed to melt at a particular temperature or over a specific temperature range. In this way, the expansion of the wax pellet increases surface area contact with an interior wall of the shell and thereby linearly urges the first piston and the stem axially away from the first retention plate. The linear movement of the stem causes the second piston to disengage the valve seat and thereby permit water to flow downstream of the second retention plate. Such an arrangement provides the unexpected and unpredicted advantage of providing a temperature-activated automatic release mechanism for discharging the heated water from the hose.

The spring may be compressed along the linear travel path when the second piston is disengaged from the valve seat. The spring automatically returns to equilibrium when the second piston linearly retracts and engages the valve seat and thereby prohibits water to flow downstream of the second piston. Of course, the spring may be calibrated to have a force, which is overcome by the force of the expanding wax. In this manner, the spring may be reciprocated a multiple of times without losing its resilience. Such an arrangement provides the unexpected and unpredictable advantage of repeatedly utilizing the temperature-operated water flow valve without risking premature failure of such a mechanism.

The second retention plate may include a linear rod protruding upstream therefrom such that the spring may be concentrically wound thereabout. In this manner, the spring remains concentrically aligned about a central longitudinal axis passing through the body and thereby ensures the second piston is uniformly displaced along the linear travel path.

The invention may further include a method of utilizing a combined water hose and temperature-operated water flow valve for selectively ejecting naturally heated water stored in the water hose. Such a method may include the chronological steps of: providing a water hose including a plurality of thermo-conductive heating elements located therein for heating water inside the water hose; and providing and removably coupling a temperature-operating water flow valve to the water hose.

The method may further include the chronological steps of: providing a hollow body preferably having axially offset proximal and distal open ends respectively. Such a body preferably has an internal temperature. The step of providing the body may include the chronological sub-step of: providing and seating a temperature-activated plunger release mechanism inside the body such that the temperature-activated plunger release mechanism is intermediately positioned between the proximal and distal open ends respectively.

The method may further include the chronological steps of: automatically reciprocating the temperature-activated plunger release mechanism along a linear travel path as the internal temperature rises above a threshold internal temperature and falls below the threshold internal temperature respectively; and automatically opening and closing the temperature-activated plunger release mechanism during the reciprocation along the linear travel path such that water is respectively permitted and prohibited to egress the distal open end of the body.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "present invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The below disclosed subject matter is to be considered illustrative, and not restrictive, and the appended claims are intended to cover all such modifications, enhancements, and other embodiments which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

Referring generally to FIGS. 1-5, one embodiment of the present invention may include only a stand-alone temperature-operated water flow valve 20. Another embodiment may include an assembly 10 preferably having a combined water hose 11 and temperature-operated water flow valve 20 may include a water hose 11 having a plurality of thermo-conductive heating elements 12 located therein for heating water inside the water hose 11. A temperature-operating water flow valve 20 may be removably coupled to the water hose 11.

Figures 1, 1A, 2:
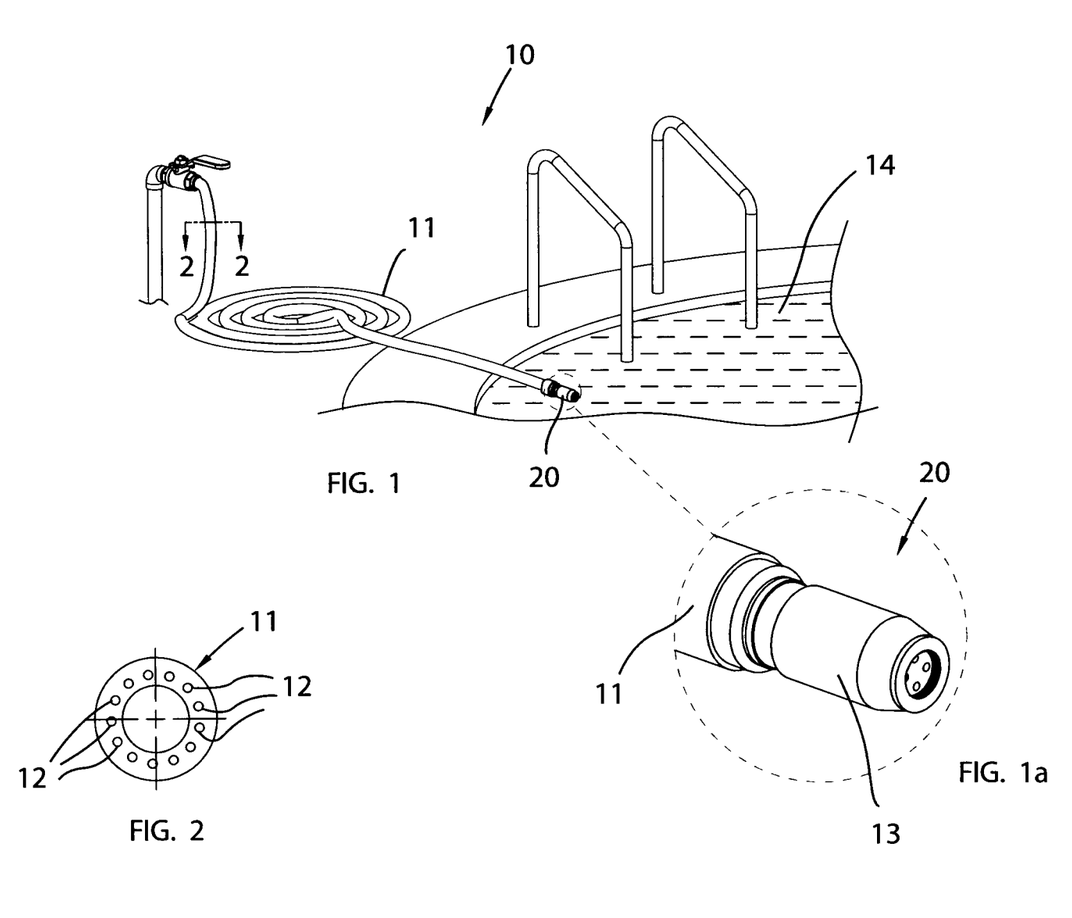
FIG. 1 is a perspective view showing a combined water hose and temperature-operated water flow valve, in accordance with the present invention.
FIG. 1A is an enlarged perspective view of the temperature-operated water flow valve shown in FIG. 1.
FIG. 2 is a cross-sectional view of the water hose taken along line 2-2 shown in FIG. 1.

Referring to FIGS. 1 and 1A, assembly 10 preferably includes a temperature-operated-operated water flow valve 20 having a threaded proximal end, which is essential for being attached onto a male end of a standard garden hose 11. Such a valve 20 may include a hard and durable protective thermoplastic cover 13. The male-threaded hose 11 connection, temperature-activated water flow valve mechanism 50 and valve 20 may be at least partially produced from thermally conductive metals, like brass or steel, and may be enclosed in a body 21, onto which the protective cover 13 is fitted. The assembly 10 is compact in size and is cylindrically-shaped so that the assembly 10 is easily grasped within a user's fist. The thermoplastic cover 13 advantageously protects the temperature-operated water flow valve 20 from direct sunlight and soil to prevent user burns when gripped. Valve 20 also directs heated water 15 out of the hose 11 into a desired body of water 14. Of course, the valve 20 may be rated to open at different temperatures depending on the user's needs, as is obvious to a person of ordinary skill in the art.

Referring to the FIGS. 1-5, water in hose 11 is effectively heated by solar radiation, and is subsequently released from the hose 11 to the pool 14 once it reaches a threshold temperature, which opens valve 20 and lets the heated water 15 run through the hose 11. The valve 20 includes a temperature-activated plunger release mechanism 50 therein that makes use of a wax pellet 28 inside the body 21. Of course, the term wax pellet 28 may be construed as either a plurality of compact wax pellets or a single body of homogenous wax. Such a wax pellet 28 is solid at low temperatures but melts and expands when heated. When the wax pellet 28 expands, the change in volume within the shell 27 pushes the valve stem 30, which opens the valve 20, thus allowing the heated water 15 to pass through body 21. The temperature at which this occurs is determined by the specific composition of the wax, so valves 20 of this type can advantageously open at different temperatures.

Figure 3:
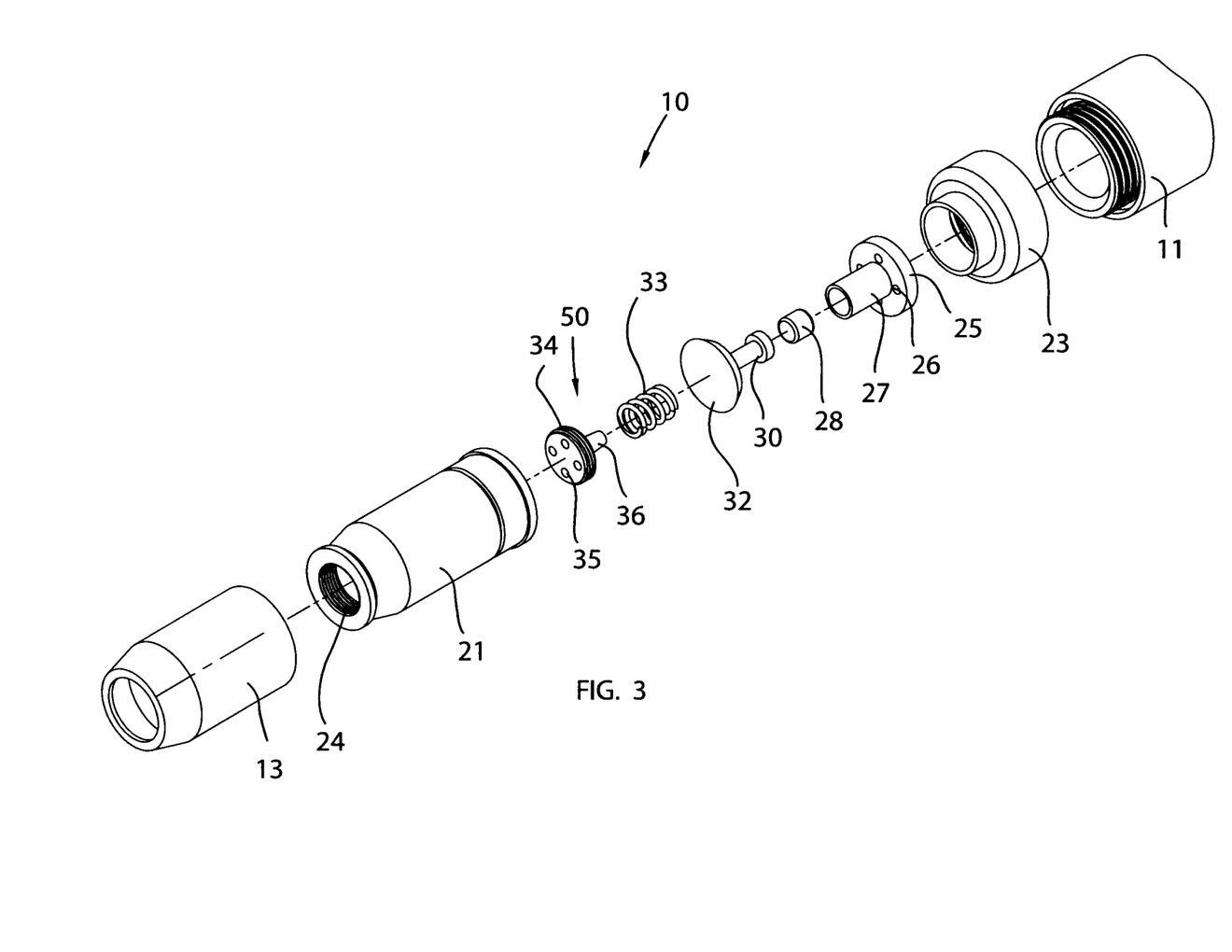
FIG. 3 is an exploded view showing the relationship between the internal components of the temperature-operated water flow valve in FIG. 1.
Figure 4:
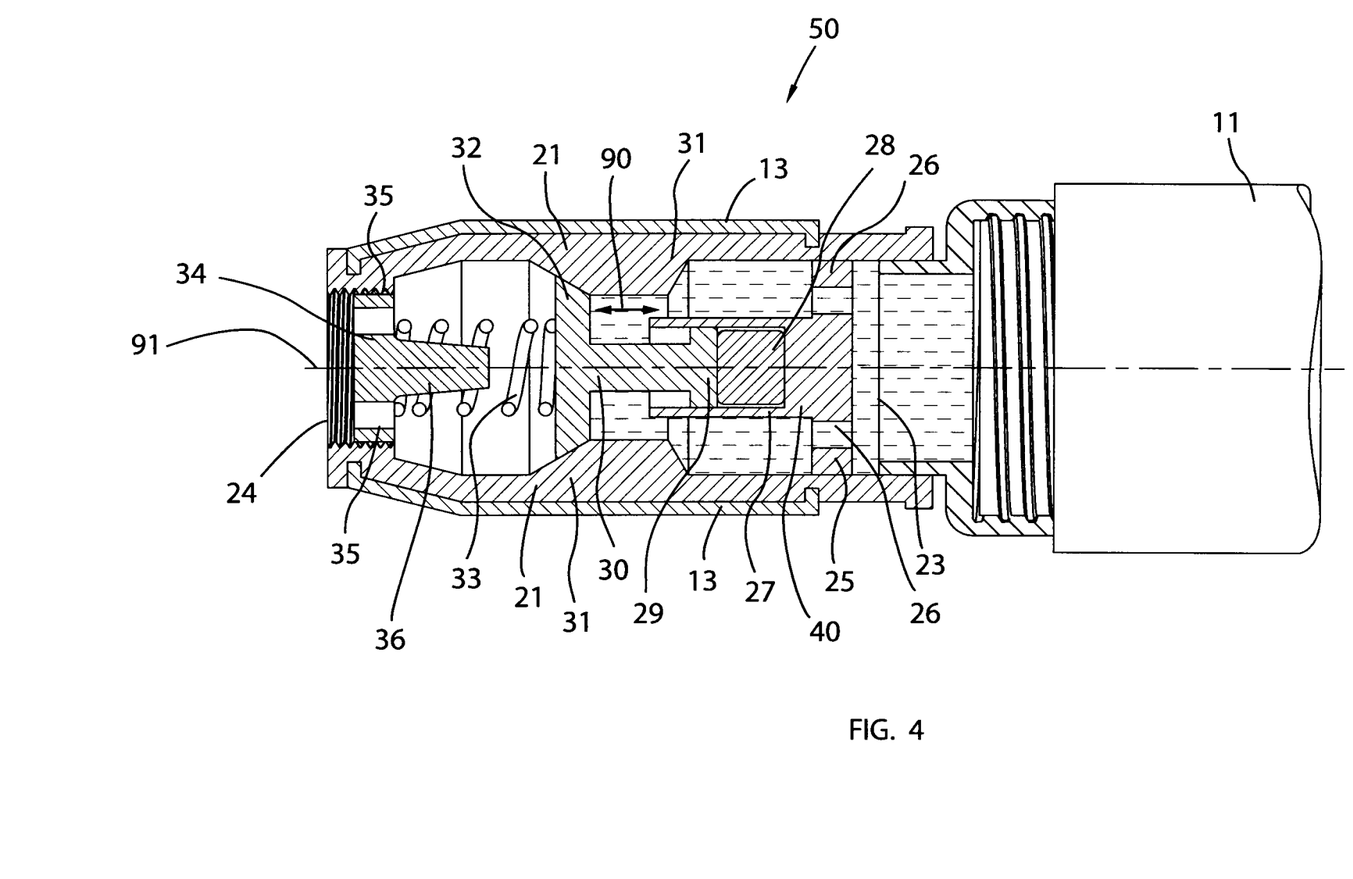
FIG. 4 is an enlarged cross-sectional view of the temperature-operated water flow valve at a closed position.
Figure 4B:
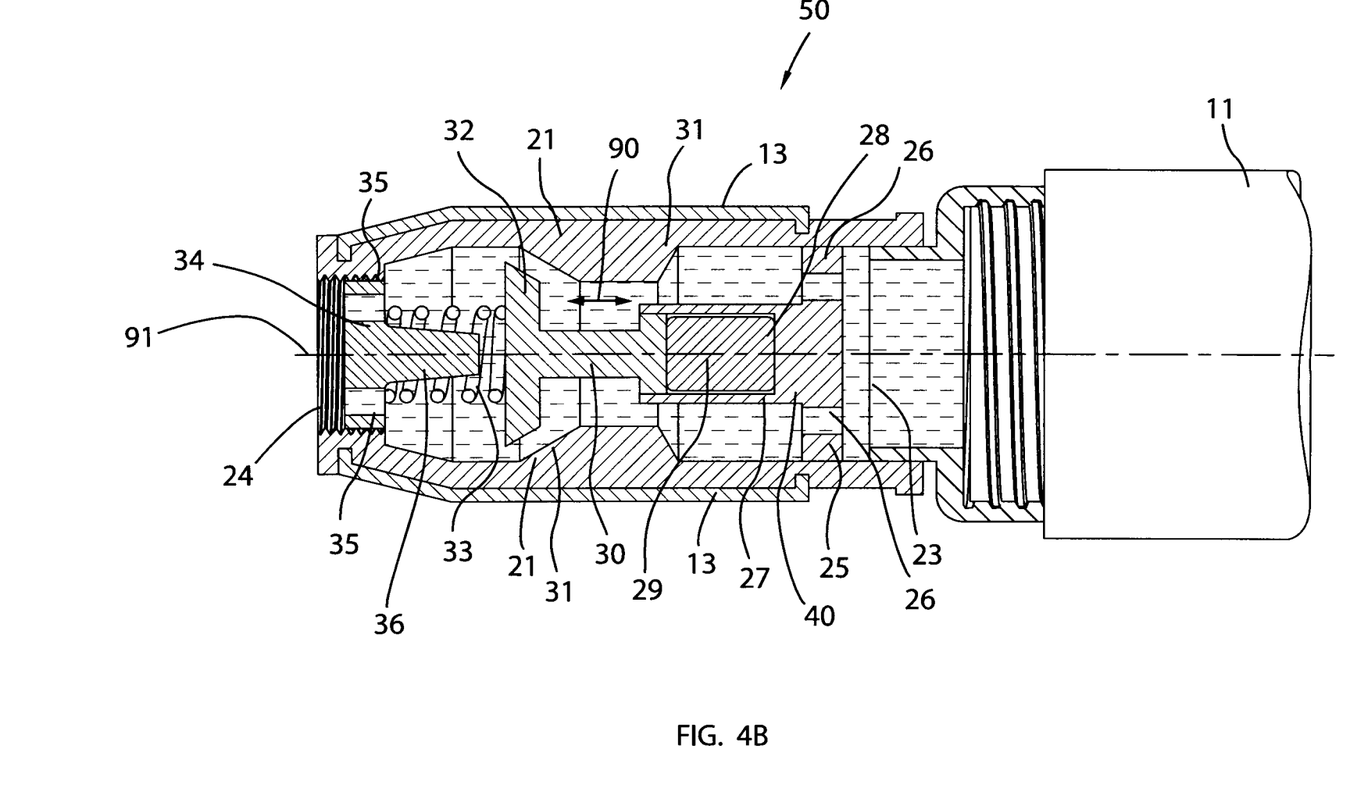
FIG. 4B is an enlarged cross-sectional view of the temperature-operated water flow valve at an open position.
Figure 5:
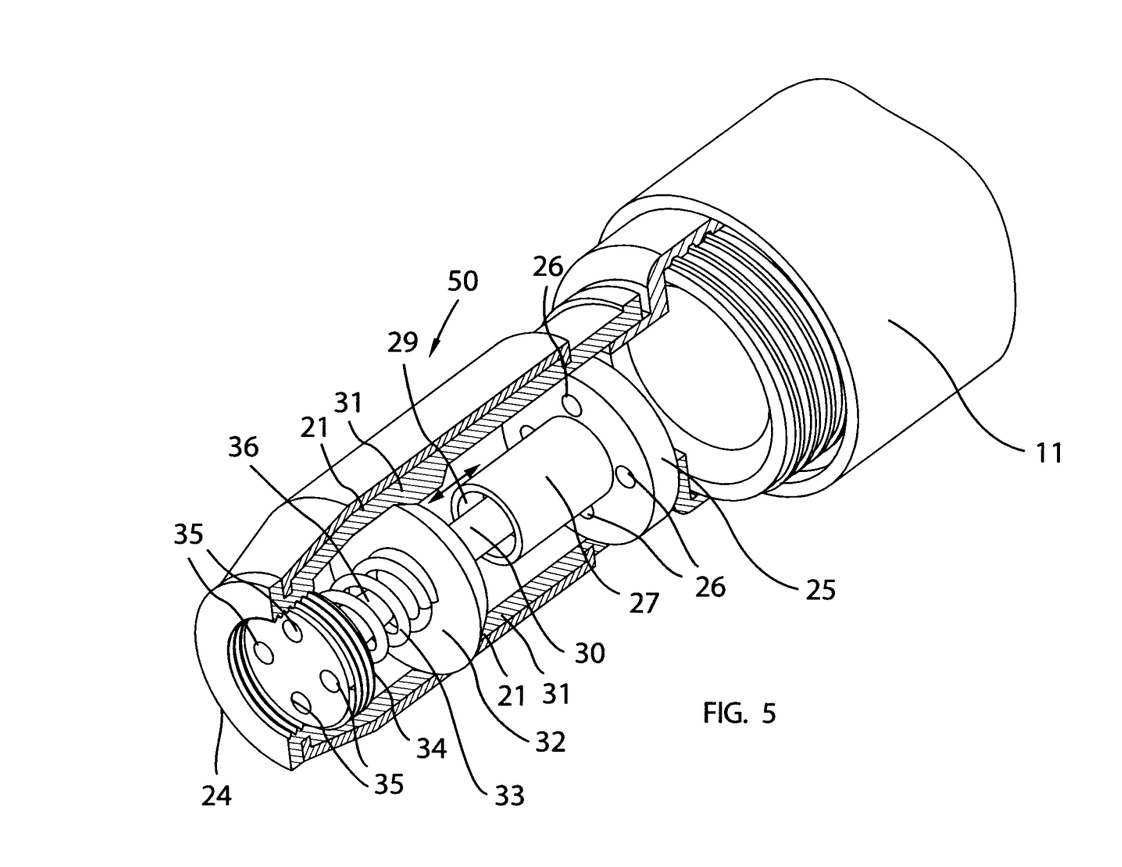
FIG. 5 is an enlarged cut-out view of the temperature-operated water flow valve shown in FIG. 1A.

Referring to FIGS. 3-5 in more detail, the temperature-operating water flow valve 20 may include a hollow body 21 preferably has axially offset proximal and distal open ends 23, 24 respectively. The body 21 maintains an internal temperature. A temperature-activated plunger release mechanism 50 may be seated inside the body 21 and intermediately positioned between the proximal and distal open ends 23, 24 respectively. The temperature-activated plunger release mechanism 50 may further be automatically reciprocated along a linear travel path 90 as the internal temperature rises above a threshold internal temperature and falls below the threshold internal temperature respectively. In this way, the temperature-activated plunger release mechanism 50 automatically opens and closes during reciprocation along the linear travel path 90 such that heated water 15 is respectively permitted and prohibited to egress the distal open end 24 of the body 21. The energy of the sun may be utilized to heat the water contained within the hose 11 thereby selectively releasing heated water from the valve 20 at a predetermine temperature. Such an arrangement provides the unexpected and unpredicted advantage of using radiant heat of the sun to heat the cold water to a predetermined temperature within the hose 11 and further release the heated water 15 into a swimming pool, for example, thus saving energy costs for a user.

Referring to FIGS. 4, 4B and 5, the temperature-activated plunger release mechanism 50 may include a first retention plate 25 preferably having a plurality of apertures 26 formed therein for permitting water to flow downstream towards the distal open end 24. The first retention plate 25 preferably has a shell 27 integrally formed therewith and axially extending towards the distal open end 24. A wax pellet 28 may be located within the shell 27. A first piston 29 may be dynamically interfitted within the shell 27 and directly abutted against the wax pellet 28. A stem 30 may be connected to the first piston 29. The hollow body 21 may further include a valve seat 31 inwardly protruding towards a center of the body 21 such that a maximum diameter of the valve seat 31 is less than a maximum diameter of the body 21. A second piston 32 may be connected to the stem 30 and removably conjoined to the valve seat 31.

A deformably resilient spring 33 may be fixedly attached to the second piston 32. A second retention plate 34 may be engaged with the spring 33 and located at the distal open end 24 of the body 21. The second retention plate 34 preferably has a plurality of openings 35 formed therein for permitting water to egress the body 21. Such an arrangement provides the unexpected and unpredictable advantage of providing a small and compact configuration of internal components that are linearly arranged within the valve body 21 such that the body 21 can be fitted to hose 11 without the use of intervening elements.

Referring specifically to FIGS. 4 and 4B, the wax pellet 28 may be at a solid state when the internal temperature is below the threshold internal temperature. The wax pellet 28 may expand to a melted state when the internal temperature is above the threshold internal temperature. It is well known in the art that such wax pellets 28 may be utilized in automotive thermostats and hot water safety relief valves and can be applied to a wide range of applications that require specific, narrow temperature ranges safely and reliably. For example, "Astorstat" distilled waxes have successfully passed thousands of expansion-cycles without suffering any critical property degradation as referenced on the website http://igiwax.com/industries-applications/thermostat-and-distillation-products/.

The wax pellet 28 may be selectively designed to melt at a particular temperature or over a specific temperature range. In this way, the expansion of the wax pellet 28 increases surface area contact with an interior wall 40 of the shell 27 and thereby linearly urges the first piston 29 and the stem 30 axially away from the first retention plate 25. The linear movement of the stem 30 causes the second piston 32 to disengage the valve seat 31 and thereby permit heated water 15 to flow downstream of the second retention plate 34. Such an arrangement provides the unexpected and unpredicted advantage of automatically releasing the heated water 15 from hose 11 at a predetermined temperature or temperature range.

Again referring to FIGS. 4 and 4B, the spring 33 is compressed along the linear travel path 90 when the second piston 32 is disengaged from the valve seat 31. Such a spring 33 automatically returns to equilibrium when the second piston 32 linearly retracts and engages the valve seat 31 and thereby prohibits water to flow downstream of the second piston 32. One skilled in the art understands the spring 33 may be calibrated to have a desired frictional force that may be overcome by the force of the expanding wax pellet 28 so that spring 33 may be reciprocated a multiple of times without losing its resilience. Such an arrangement provides the unexpected and unpredictable advantage of repeatedly utilizing the temperature-operated water flow valve 20 without risking premature failure of mechanism 50.

Referring to FIGS. 3-5, the second retention plate 34 may include a linear rod 36 protruding upstream therefrom such that the spring 33 may be concentrically wound thereabout. In this manner, the spring 33 preferably remains concentrically aligned about a central longitudinal axis 91 (FIG. 4) passing through the body 21 and thereby ensuring the second piston 32 is uniformly displaced along the linear travel path 90.

The present invention may further include a method of utilizing a combined water hose and temperature-operated water flow valve 10 for selectively ejecting naturally heated water stored in the water hose 11. Such a method preferably includes the chronological steps of: providing a water hose 11 including a plurality of thermo-conductive heating elements 12 located therein for heating water inside the water hose 11; and providing and removably coupling a temperature-operating water flow valve 20 to the water hose 11.

The method may further include the chronological steps of: providing a hollow body 21 preferably having axially offset proximal and distal open ends 23, 24 respectively. Such a body 21 preferably has an internal temperature associated therewith. The step of providing body 21 preferably includes the chronological sub-step of: providing and seating a temperature-activated plunger release mechanism 50 inside the body 21 such that the temperature-activated plunger release mechanism 50 is intermediately positioned between the proximal and distal open ends 23, 24 respectively.

The method may further include the chronological steps of: automatically reciprocating the temperature-activated plunger release mechanism 50 along a linear travel path 90 as the internal temperature rises above a threshold internal temperature and falls below the threshold internal temperature respectively; and automatically opening and closing the temperature-activated plunger release mechanism 50 during the reciprocation along the linear travel path 90 such that heat water 15 is respectively permitted and prohibited to egress the distal open end 24 of the body 21.

The combination of such claimed elements provides an unpredictable and unexpected benefit of automatically discharging heating water 15 from a hose 11 into a swimming pool when an internal temperature of body 21 rises above a threshold temperature by making use of the sun's radiant heat in an outdoor environment. Such a benefit solves the problem of having to unnecessarily heat a swimming pool.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation.

What is claimed as new and what is desired to secure by Letters Patent of the United States is:

1. A temperature-operated water flow valve for selectively ejecting naturally heated water stored in a hose, said temperature-operated water flow valve comprising:
   a hollow body having axially offset proximal and distal open ends respectively, said body further having an internal temperature; and
   a temperature-activated plunger release mechanism seated inside said body and intermediately positioned between said proximal and distal open ends respectively;
   wherein said temperature-activated plunger release mechanism automatically reciprocates along a linear travel path as said internal temperature rises above a threshold internal temperature and falls below the threshold internal temperature respectively;
   wherein said temperature-activated plunger release mechanism is automatically opened and closed during said reciprocation along said linear travel path such that water is respectively permitted and prohibited to egress said distal open end of said body;
   wherein said temperature-activated plunger release mechanism comprises
   a first retention plate having a plurality of apertures formed therein for permitting water to flow downstream towards said distal open end, said first retention plate further having a shell integrally formed therewith and axially extending towards said distal open end;

a wax pellet located within said shell;

a first piston dynamically interfitted within said shell and directly abutted against said wax pellet;

a stem connected to said first piston;

a valve seat inwardly protruding towards a center of said body such that a maximum diameter of said valve seat is less than a maximum diameter of said body;

a second piston connected to said stem and removably conjoined to said valve seat;

a deformably resilient spring fixedly attached to said second piston; and a second retention plate engaged with said spring and located at said distal open end of said body, said second retention plate having a plurality of openings formed therein for permitting water to egress said body.

2. The temperature-operated water flow valve of claim 1, wherein said wax pellet is at a solid state when said internal temperature is below the threshold internal temperature, said wax pellet expanding to a melted state when said internal temperature is above said threshold internal temperature.

3. The temperature-operated water flow valve of claim 2, wherein expansion of said wax pellet increases surface area contact of said wax pellet with an interior wall of said shell and thereby linearly urges said first piston and said stem axially away from said first retention plate.

4. The temperature-operated water flow valve of claim 3, wherein linear movement of said stem causes said second piston to disengage said valve seat and thereby permit water to flow downstream of said second retention plate.

5. The temperature-operated water flow valve of claim 4, wherein said spring is compressed along the linear travel path when said second piston is disengaged from said valve seat, said spring automatically returning to equilibrium when said second piston linearly retracts and engages said valve seat and thereby prohibits water to flow downstream of said second piston.

6. The temperature-operated water flow valve of claim 5, wherein said second retention plate comprises: a linear rod protruding upstream therefrom such that said spring is concentrically wound thereabout, said spring remaining concentrically aligned about a central longitudinal axis passing through said body and thereby ensuring said second piston is uniformly displaced along said linear travel path.

7. A combined water hose and temperature-operated water flow valve for selectively ejecting naturally heated water stored in the water hose, said combined water hose and temperature-operated water flow valve comprising:

a water hose including a plurality of thermo-conductive heating elements located therein for heating water inside said water hose; and a temperature-operating water flow valve removably coupled to said water hose, said temperature-operating water flow valve comprising a hollow body having axially offset proximal and distal open ends respectively, said body further having an internal temperature, and a temperature-activated plunger release mechanism seated inside said body and intermediately positioned between said proximal and distal open ends respectively;

wherein said temperature-activated plunger release mechanism automatically reciprocates along a linear travel path as said internal temperature rises above a threshold internal temperature and falls below the threshold internal temperature respectively;

wherein said temperature-activated plunger release mechanism is automatically opened and closed during said reciprocation along said linear travel path such that water is respectively permitted and prohibited to egress said distal open end of said body;

wherein said temperature-activated plunger release mechanism comprises a first retention plate having a plurality of apertures formed therein for permitting water to flow downstream towards said distal open end, said first retention plate further having a shell integrally formed therewith and axially extending towards said distal open end;

a wax pellet located within said shell;

a first piston dynamically interfitted within said shell and directly abutted against said wax pellet;

a stem connected to said first piston;

a valve seat inwardly protruding towards a center of said body such that a maximum diameter of said valve seat is less than a maximum diameter of said body;

a second piston connected to said stem and removably conjoined to said valve seat;

a deformably resilient spring fixedly attached to said second piston; and a second retention plate engaged with said spring and located at said distal open end of said body, said second retention plate having a plurality of openings formed therein for permitting water to egress said body.

8. The combined water hose and temperature-operated water flow valve of claim 7, wherein said wax pellet is at a solid state when said internal temperature is below the threshold internal temperature, said wax pellet expanding to a melted state when said internal temperature is above said threshold internal temperature.

9. The combined water hose and temperature-operated water flow valve of claim 8, wherein expansion of said wax pellet increases surface area contact of said wax pellet with an interior wall of said shell and thereby linearly urges said first piston and said stem axially away from said first retention plate.

10. The combined water hose and temperature-operated water flow valve of claim 9, wherein linear movement of said stem causes said second piston to disengage said valve seat and thereby permit water to flow downstream of said second retention plate.

11. The combined water hose and temperature-operated water flow valve of claim 10, wherein said spring is compressed along the linear travel path when said second piston is disengaged from said valve seat, said spring automatically returning to equilibrium when said second piston linearly retracts and engages said valve seat and thereby prohibits water to flow downstream of said second piston.

12. The combined water hose and temperature-operated water flow valve of claim 11, wherein said second retention plate comprises: a linear rod protruding upstream therefrom such that said spring is concentrically wound thereabout, said spring remaining concentrically aligned about a central longitudinal axis passing through said body and thereby ensuring said second piston is uniformly displaced along said linear travel path.

13. A method of utilizing a combined water hose and temperature-operated water flow valve for selectively ejecting naturally heated water stored in the water hose, said method comprising the chronological steps of:

a. providing a water hose including a plurality of thermo-conductive heating elements located therein for heating water inside said water hose;
b. providing and removably coupling a temperature-operating water flow valve to said water hose, wherein step b. comprises the chronological steps of
   i. providing a hollow body having axially offset proximal and distal open ends respectively, said body further having an internal temperature, and
   ii. providing and seating a temperature-activated plunger release mechanism inside said body such that said temperature-activated plunger release mechanism is intermediately positioned between said proximal and distal open ends respectively;
   automatically reciprocating said temperature-activated plunger release mechanism along a linear travel path as said internal temperature rises above a threshold internal temperature and falls below the threshold internal temperature respectively; and
   automatically opening and closing said temperature-activated plunger release mechanism during said reciprocation along said linear travel path such that water is respectively permitted and prohibited to egress said distal open end of said body;
   wherein said temperature-activated plunger release mechanism comprises a first retention plate having a plurality of apertures formed therein for permitting water to flow downstream towards said distal open end, said first retention plate further having a shell integrally formed therewith and axially extending towards said distal open end;
a wax pellet located within said shell;
a first piston dynamically interfitted within said shell and directly abutted against said wax pellet;
a stem connected to said first piston;
a valve seat inwardly protruding towards a center of said body such that a maximum diameter of said valve seat is less than a maximum diameter of said body;
a second piston connected to said stem and removably conjoined to said valve seat;
a deformably resilient spring fixedly attached to said second piston; and
a second retention plate engaged with said spring and located at said distal open end of said body, said second retention plate having a plurality of openings formed therein for permitting water to egress said body.

* * * * *